April 8, 1969 J. P. FOLEY 3,436,855

BRACKET MOUNTED TELEPHONE INDEX DEVICE

Filed May 16, 1966

INVENTOR.
JAMES P. FOLEY
BY
Ward, Haselton, McElhannon, Orme, Brooks & Fitzpatrick
ATTORNEYS 3,436,855

BRACKET MOUNTED TELEPHONE INDEX DEVICE

James P. Foley, 748 Forest Ave.,
Larchmont, N.Y. 10538

Filed May 16, 1966, Ser. No. 550,349
Int. Cl. G09f 3/20
U.S. Cl. 40—336 13 Claims

ABSTRACT OF THE DISCLOSURE

A telephone number index device having a support member attached to the side of the telephone mounting a plurality of index cards in book-like manner with the free edges facing in abutting relation to the telephone cover and the hinged edges away from said cover so that the book-like assembly is capable of being flicked open to a beginning page with the free edges now facing away from the telephone cover for convenient manipulation.

This invention relates to index devices and more particularly it concerns an improved telephone number index apparatus for use on and with various types of telephones.

It is often desirable to have available near a telephone a listing of various frequently called numbers. This is particularly so where, as in large urban areas, the standard directory is cumbersome and inconvenient to use. Also, while the usual standard directory is overly complete for most local use, it usually provides no information whatever as to long distance numbers.

Various arrangements have been provided in the past for making frequently called number information readily accessible to the telephone user. By and large however these prior arrangements have been relatively expensive. Also they were quite bulky, which made shipment and storage somewhat impractical.

The present invention provides a solution to these problems of the prior art. According to the present invention there is provided a telephone number index arrangement which is mountable directly on a telephone for convenient and ready reference. This index arrangement has a substantial information storage capacity and yet is not bulky; nor does it interfere at all with dialing or other operations of the telephone.

As illustratively embodied, the arrangement of the present invention comprises a flat elongated rigid support member with a bracket member depending from one edge and toward one end of the support member. The bracket member is provided with adhesive, suction, or other attachment means by which it is secured to the side of a telephone so that the flat support member extends out from the side of the telephone in substantially coplanar relationship with the telephone dial. A book-like assembly of telephone number index sheets is mounted on the support member with the botom sheet affixed to the surface of the support member. When the book-like assembly is closed, the hinged edges of the sheets are away from the telephone while the open or free edges are closely adjacent the telephone. This permits the sheets to open without interfering with the telephone dial.

While the above described arrangement would be expected to interfere with the turning of the sheets or pages of the index, since their free edges abut against the telephone cover, this does not happen in the case of the present invention. According to the invention, a recess is cut into the inner (telephone) edge of the support member and the sheet affixed thereto. This recess is located down toward the lower end of the assembly which protrudes out beyond the end of the telephone cover. This arrangement permits the entire book-like assembly to be opened with a simple movement of the finger, first to expose a most frequently called number page and at the same time to set the free edges of the other pages in a position for easy manipulation.

In one of its aspects the present invention provides a novel hinged card index assembly which is characterized by high strength, durability and ease of magnipulation. According to this aspect of the invention, the assembly is made up of a plurality of relatively stiff paperboard sheets individually having a thickness of at least eight thousands of an inch. These sheets are hinged together along their edges by means of a common fabric backing impregnated with a pliable binding glue. The thickness of the glue-fabric backing is preferably less than that of the individual sheets and its flexibility from sheet to sheet is greater so that as the individual sheets are opened they do not bend but instead are hinged about a portion of the backing. This permits the sheets to be held securely together and at the same time to open easily and flatly.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein.

Figures 1, 2, 3, 4, 5, 6:
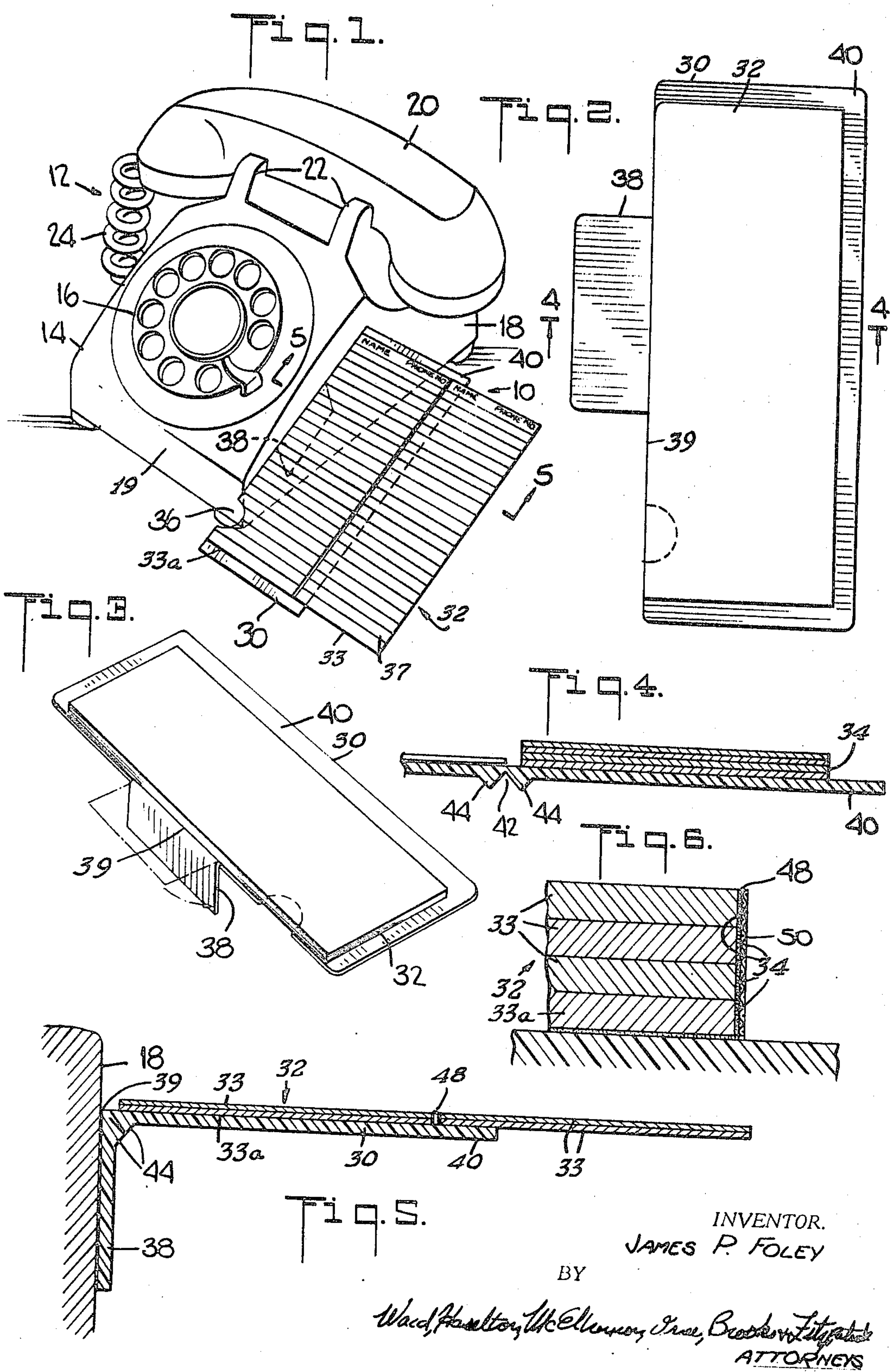
FIG. 1 is a perspective view of a telephone outfitted with a telephone index device, shown in opened condition, and which embodies the present invention.
FIG. 2 is a top plan view of a telephone index device according to the present invention, as it appears during shipment and prior to mounting on a telephone.
FIG. 3 is a perspective view of the telephone index device of FIG. 2 ready for mounting to a telephone.
FIG. 4 is an enlarged section view taken along line 4—4 of FIG. 2.
FIG. 5 is an enlarged section view taken along line 5—5 of FIG. 1 except that one telephone index sheet of the book like assembly has been turned from right to left.
FIG. 6 is an even further enlarged view of a portion of FIG 4.

As shown in FIG. 1 a telephone index assembly 10 embodying the present invention is attached to a conventional table model telephone, indicated generally at 12. The telephone 12 has an outer plastic cover 14, which is formed to define a slanted dialing surface upon which a dial 16 is mounted. The cover 14 extends downwardly from edges located just beyond the periphery of the dial 16 to form side surfaces 18 and a front surface 19 of the cover 14. A hand set 20 is cradled in supporting brackets 22 near the top of the telephone. A cord 24 extends out from the left side of the telephone cover 14 and extends to the hand set 20.

The telephone index assembly 10 comprises a flat, elongated, and generally rectangular, rigid support member 30 which is arranged to extend outwardly from the side 18 of the telephone 12, in generally coplanar relationship with the dial 16 of the telephone. A book-like assembly 32 of telephone index sheets 33, is mounted on the support member 30, with a lowermost sheet 33*a* being adhesively secured to the upper surface of the support member 30. The individual sheets 33 making up the book-like assembly 32 are hinged along an edge 34, which, when the sheets are in closed arrangement, is away from the telephone cover 14. Thus, as shown, the assembly 32 opens from left to right, away from the telephone cover 12. This provides a compact arrangement, for when the book-like assembly 32 is closed it is immediately adjacent to the telephone. At the same time, the device is conveniently useable, for the individual sheets 33 open away from and not over the dial 16.

It will be noted that in the arrangement of FIG. 1, the index assembly 10 is specially positioned on the right hand side of the telephone 12. This serves to avoid any interference by the cord 24 when the telephone hand set 20 is being manipulated. The cord 24, it will be noted, extends out from the left hand side of the telephone cover 14. With the index assembly 10 placed on the right hand side of the cover 14 however, the book-like assembly 32, in order to open out away from the telephone, must open from left to right, as opposed to the more conventional manner, i.e., from right to left. Moreover, irrespective of what side of the telephone cover 14, the index assembly 10 happens to be mounted, the provision of the hinged edges 34 away from the telephone cover 14, results in the free edges of the sheets closely abutting the telephone cover when the book-like assembly 32 is in closed condition. Because of this, the free edges of the individual sheets 33 are not readily accessible for individual manipulation.

In order to facilitate the manipulation of the individual sheets 33, even though their outer edges are closely adjacent to the sides of the telephone, there is provided a recess or cutout 36 in the edge of the support member 30 and in the edge of the lowermost sheet 33*a* of the book-like assembly 32. This recess 36 is located toward the bottom of the support member 30 out beyond the front surface 19 of the telephone cover 14. It will be seen that simply by inserting one's finger or thumb in the place of the recess 36, all but the lowermost sheet 33*a* of the book assembly 32 may be turned about the hinged edges 34. This immediately exposes a first page 37 on which most frequently called numbers may be listed. At the same time, it brings all of the turnable sheets to a position where their free edges are away from the telephone cover 14. Thus the sheets are easily manipulated. Further, where the device is mounted on the right hand side of the telephone, the assembly 32 then opens like a conventional book, i.e., from right to left.

The support member 30 is secured to the telephone 12 by means of a depending flange or bracket 38 upon the upper or outer surface of which may be placed some sort of adhering means. For example, double backed adhesive tape may be placed on the outer surface of the bracket 38, or the bracket may be coated with an adhesive substance. Additionally, suction cups or other well known adhering means may be provided.

As shown in FIGS. 2 and 3, the bracket 38 is formed integrally with the support member 30 and is bendable about a bend line 39. Thus, the entire unit may be shipped economically in flattened condition. Thereafter, as indicated in FIG. 3, the bracket 38 is bent downwardly so that the entire unit may be attached to the telephone. It will also be noted, as indicated in FIG. 2, that the support member 30 is wider than the sheets 33 making up the book-like assembly 32, thus leaving a marginal edge 40 when the assembly 32 is closed. This marginal edge as can be seen in FIG. 1, serves to support the opened sheets 33 holding them in flattened condition for convenient reference.

In order to provide convenient and accurate bending of the bracket portion 38 there is provided a bend groove 42 as shown in FIG. 4 along the bend line 39 of the bracket 38. In order to improve the rigidity of the assembly after the bracket 38 is so bent, there are additionally provided a pair of slightly protruding lugs 44 which extend along both sides of the bend groove immediately adjacent thereto. These lugs 44 come together, as shown in FIG. 5 and serve to provide a corner support in the vicinity of the bend groove 42.

Turning now to FIG. 6, it will be seen that the individual sheets making up the book-like assembly 32 are at least .008 and preferably .010 inch in thickness so that there is provided along their hinged edges 34 a finite surface area for adherence by a backing or binding 48. The binding 48 is made up of a fabric like material such as cheese-cloth 50 which is impregnated with a bindery glue. This bindery glue is preferably of a pliable consistency when fully cured and is put on in such a manner that it has a thickness which is less than the thickness of the individual sheets. Because of the thickness and relative stiffness of the individual sheets 33 making up the book-like assembly 32, these sheets tend not to bend when opened. One reason for this is that the pliability or flexibility of the pliable bindery glue and backing material 50 is greater than that of the individual sheets 33. All bending is thus relegated to the binding 48. Since the individual sheets 33 undergo no bending they lie flat for clear and convenient viewing. Moreover, because of the pliability and the lack of resiliency of the glue-fabric backing 48, the sheets will remain open and in flattened condition as shown in FIG. 5 with no tendency to spring back toward a closed or partially closed position, as usually occurs when opening is accompanied by bending of the sheets themselves. Thus, when the book-like assembly is open it will remain perfectly flat as shown in FIG. 5 without requiring the user to hold it open to a particular page. Also, when it is reclosed, it will attain a flat, fully closed position as shown in FIG. 3.

Having thus described the invention with particular reference to the preferred forms thereof, it will be obvious to those skilled in the art to which the invention pertains, after understanding the invention, that various other changes and modifications may be made therein without departing from the spirit and scope of the invention, as defined by the claims appended hereto.

What is claimed as new and desired to be secured by Letters Patent is:

1. A telephone index assembly comprising a flat elongated rigid support member, a bracket member constructed to be held against the side of a telephone cover, said bracket member being attached to said support member in a manner causing said support member to extend out from the side of said telephone, a book like assembly of flat elongated telephone index sheets for bearing thereon telephone number information, said sheets being hinged one to the other with a common binding member at one longitudinal edge, in such a manner that each of said telephone index sheets will be flat with respect to each other in a fully opened or closed position, said book like assembly being secured by the bottom sheet thereof to said support member to lie in closed condition with the free edges of said sheets in abutting relation to said telephone cover and said hinged edges facing away from said cover, and wherein said support member is wider than the said sheets and thus provides a support surface between said hinged edges and the end of said support surface for supporting opened sheets in substantially coplanar relationship with said bottom sheet, said sheets other than said bottom sheet being shaped with respect to said bottom sheet and said support member such that a portion of said other sheets toward their free edges, overhangs a corresponding portion of said bottom sheet and said support member to permit finger insertion for opening of all said other sheets to a beginning page with the free edges of said sheets facing away from said telephone cover for convenient manipulation.

2. A telephone index assembly as in claim 1 wherein said bottom sheet and said support member are recessed along one edge thereof.

3. A telephone index assembly as in claim 1 wherein said bracket member is located along one longitudinal edge of said support member.

4. A telephone index assembly as in claim 1 wherein said bracket member is located along the left hand longitudinal edge of said support member for permitting right hand mounting of said device away from interference with the handset wire of a telephone.

5. A telephone index assembly comprising a flat elongated rigid support member, a bracket member constructed to be held against the side of a telephone cover, wherein said bracket member and said support member are made of rigid sheet material, said bracket member extending downwardly from one longitudinal edge of said support member at right angle thereto and having means for being adhered to the outer surface of said telephone cover, a book like assembly of flat elongated telephone index sheets for bearing thereon telephone information, said sheets being hinged together along one longitudinal edge, said book like assembly being secured by the bottom sheet thereof to said support member to lie in closed condition with the free edges of said sheets in abutting relation to said telephone cover and said hinged edges facing away from said cover, said sheets other than said bottom sheet being shaped with respect to said bottom sheet and said support member such that a portion of said other sheets toward their free edges, overhangs a corresponding portion of said bottom sheet and said support member to permit finger insertion for opening of all said other sheets to a beginning page with the free edges of said sheets facing away from said telephone cover for convenient manipulation.

6. A telephone index assembly as in claim 5 wherein said bracket member is integral with said support member.

7. A telephone index assembly as in claim 6 wherein said bracket member is formed as a generally coplanar extension of and extends out from one longitudinal edge of said support member and is bendable downwardly about a bend line coincident with said longitudinal edge.

8. A telephone index assembly as in claim 7 wherein said bracket member and said support member are formed with a bend groove along said bend line on the under surface of said support member.

9. A telephone index assembly as in claim 8 wherein there is provided at least one support lug projecting outwardly from the surface of said sheet material on one side of said bend groove.

10. A telephone index assembly as in claim 5 wherein said bracket member is located along the left hand longitudinal edge of said support member for permitting right hand mounting of said device away from interference with the handset wire of a telephone.

11. A telephone index assembly as in claim 1 wherein said book like assembly comprises a stack of relatively rigid paperboard sheets each of said sheets having a thickness of at least .008 inch, hinge means binding said sheets together along one edge, said hinge means comprising a thin pliable binding material adherently affixed to the edge surfaces of each of said sheets, the flexibility of said binding material from sheet to sheet being greater than the flexibility of the individual sheets and the resiliency of said binding material from sheet to sheet being less than that of the individual sheets, thereby to permit full opening and full closing of said sheets.

12. A book like assembly as in claim 11 wherein the thickness of said binding material is substantially less than the thickness of the individual sheets.

13. A book like assembly as in claim 11 wherein said hinge means comprises a thin fabric layer impregnated with bindery glue and adhered thereby to said one edge surface of each of the sheets.

References Cited

UNITED STATES PATENTS

| | | | |
|---|---|---|---|
| 765,213 | 7/1904 | Thompson | 40—339 |
| 1,824,628 | 9/1931 | Schmalz | 40—337 |
| 1,570,430 | 1/1926 | Bowers. | |

WILLIAM H. GRIEB, *Primary Examiner.*